US010819626B2

(12) United States Patent
Chalapathy

(10) Patent No.: US 10,819,626 B2
(45) Date of Patent: Oct. 27, 2020

(54) METHOD AND APPARATUS FOR UPDATING MULTIPLE MULTIPROTOCOL LABEL SWITCHING (MPLS) BIDIRECTIONAL FORWARDING DETECTION (BFD) SESSIONS

(71) Applicant: Telefonaktiebolaget LM Ericsson (publ), Stockholm (SE)

(72) Inventor: Prasanna Chalapathy, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/319,309

(22) PCT Filed: Aug. 4, 2016

(86) PCT No.: PCT/IB2016/054721
§ 371 (c)(1),
(2) Date: Jan. 18, 2019

(87) PCT Pub. No.: WO2018/025065
PCT Pub. Date: Feb. 8, 2018

(65) Prior Publication Data
US 2019/0158394 A1    May 23, 2019

(51) Int. Cl.
*H04L 12/723* (2013.01)
*H04L 12/24* (2006.01)
(Continued)

(52) U.S. Cl.
CPC .......... *H04L 45/50* (2013.01); *H04L 41/0816* (2013.01); *H04L 43/0811* (2013.01);
(Continued)

(58) Field of Classification Search
CPC .................................................. H04L 41/0816
See application file for complete search history.

(56) References Cited

U.S. PATENT DOCUMENTS 8,902,780 B1 * 12/2014 Hegde ..................... H04L 45/70
370/252
9,036,476 B2 * 5/2015 Grandhi .................. H04L 45/22
370/235

(Continued)

OTHER PUBLICATIONS

Aggarwal R., "Applications of Bidirectional Forwarding Detection (BFD)," Juniper Networks, 2003, 34 pages.
(Continued)

*Primary Examiner* — Andrew Lai
*Assistant Examiner* — Andrew C Lee
(74) *Attorney, Agent, or Firm* — Sage Patent Group

(57) ABSTRACT

Methods and apparatuses for updating multiple multiprotocol label switching (MPLS) bidirectional forwarding detection (BFD) sessions are described. In response to determining that an MPLS BFD session is in an up state, an egress network device (ND) determines whether the MPLS BFD session is part of a plurality of MPLS BFD sessions; and responsive to determining that the MPLS BFD session is part of the plurality of MPLS BFD sessions, the egress ND transmits towards an ingress network device a BFD control packet including an ingress group identifier that uniquely identifies the plurality of MPLS BFD sessions at the ingress network device, and where the transmitting the BFD control packet causes an update of a set of two or more of MPLS BFD sessions from the plurality of MPLS BFD sessions identified based on the ingress group identifier.

20 Claims, 8 Drawing Sheets

(51) Int. Cl.
    *H04L 12/26* (2006.01)
    *H04L 12/721* (2013.01)
    *H04L 12/703* (2013.01)
    *H04L 12/707* (2013.01)
    *H04L 12/709* (2013.01)

(52) U.S. Cl.
    CPC .............. *H04L 43/10* (2013.01); *H04L 45/24* (2013.01); *H04L 45/245* (2013.01); *H04L 45/28* (2013.01); *H04L 45/70* (2013.01)

(56) References Cited

U.S. PATENT DOCUMENTS

| | | | |
|---|---|---|---|
| 9,071,514 B1* | 6/2015 | Hegde | H04L 41/0668 |
| 9,667,518 B2* | 5/2017 | Lakshmikantha | H04L 43/0852 |
| 2009/0323520 A1 | 12/2009 | Kapoor et al. | |
| 2012/0036279 A1* | 2/2012 | Boutros | H04L 69/16 709/238 |
| 2016/0119229 A1* | 4/2016 | Zhou | H04L 12/4641 370/392 |
| 2016/0197853 A1* | 7/2016 | Kumar | H04L 43/10 370/389 |

OTHER PUBLICATIONS

International Search Report and Written Opinion for Application No. PCT/IB2016/054721, dated Apr. 19, 2017, 14 pages.

RFC5884: Aggarwal R., et al., "Bidirectional Forwarding Detection (BFD) for MPLS Label Switched Paths (LSPs)," Jun. 2010, 12 pages, Internet Engineering Task Force (IETF), Request for Comments: 5884.

RFC4379: Kompella K, et al., "Detecting Multi-Protocol Label Switched (MPLS) Data Plane Failures—Standards Track," Network Working Group, Request for Comments: 4379, Updates: 1122, Feb. 2006, pp. 1-50.

RFC5880: Katz D., et al., "Bidirectional Forwarding Detection (BFD)—Standards Track," Internet Engineering Task =Force (IETF), Request for Comments: 5880, Jun. 2010, pp. 1-49.

RFC5883: Katz D., et al., "Bidirectional Forwarding Detection (BFD) for Multihop Paths—Standards Track," Internet Engineering Task Force (IETF), Request for Comments: 5883, Jun. 2010, pp. 1-6.

RFC7419: Akiya N., et al., "Common Interval Support in Bidirectional Forwarding Detection—Informational," Internet Engineering Task Force (IETF), Request for Comments: 7419, Updates: 5880, Dec. 2014, pp. 1-8.

RFC7726: Govindan V., et al., "Clarifying Procedures for Establishing BFD Sessions for MPLS Label Switched oaths (LSPs)—Standards Track," Internet Engineering Task Force (IETF), Request for Comments: 7726, Updates: 5884, Jan. 2016, pp. 1-7.

RFC7882: Aldrin S., et al., "Seamless Bidirectional Forwarding Detection (S-BFD) Use Cases," Internet Engineering Task Force (IETF), Request for Comments: 7882, Jul. 2016, pp. 1-15.

Wikipedia, "Bidirectional Forwarding Detection," Retrieved from https://en.wikipedia.org/wiki/Bidirectional_Forwarding_Detection on Jul. 22, 2016, 2 pages.

* cited by examiner

METHOD AND APPARATUS FOR UPDATING MULTIPLE MULTIPROTOCOL LABEL SWITCHING (MPLS) BIDIRECTIONAL FORWARDING DETECTION (BFD) SESSIONS

CROSS-REFERENCE TO RELATED APPLICATIONS

This application is a National stage of International Application No. PCT/IB2016/054721, filed Aug. 4, 2016, which is hereby incorporated by reference.

TECHNICAL FIELD

Embodiments of the invention relate to the field of networking; and more specifically, to the update of multiple Multiprotocol Label Switching (MPLS) Bidirectional Forwarding Detection (BFD) sessions.

BACKGROUND

One desirable application of Bidirectional Forwarding Detection (BFD) is to detect a Multiprotocol Label Switching (MPLS) Label Switched Path (LSP) data plane failure. LSP Ping is an existing mechanism for detecting MPLS data plane failures and for verifying the MPLS LSP data plane against the control plane. A combination of LSP Ping and BFD is used to provide data plane failure detection.

The Internet Engineering Task Force (IETF), Request For Comment (RFC) 5884 and RFC 7726 discuss BFD for MPLS LSPs. As discussed in RFC 5884 and RFC 7726, in order to use BFD for fault detection on an MPLS LSP data plane between an ingress network device and an egress network device (ND) (where the ingress ND and the egress ND are coupled via an IP/MPLS network), a BFD session is established for that particular MPLS LSP between the two NDs. Upon establishment of the BFD session between the two NDs, each ND forwards BFD control packets to the other ND at regular time intervals to confirm liveliness of the MPLS LSP.

The ingress ND sends BFD control packets to the egress ND, which include an ingress discriminator identifying the BFD session for that MPLS LSP at the ingress ND. The ingress discriminator is used in the "My Discriminator" field of the BFD control packets transmitted from the ingress ND towards the egress ND for that session. Further, the ingress discriminator is added to the "Your Discriminator" field of BFD control packets transmitted from the egress ND towards the ingress ND for the BFD session. The BFD control packets sent by the ingress ND are User Datagram Protocol (UDP) packets, where the source IP address is a routable IP address of the ingress ND. These packets are encapsulated in the MPLS label stack that corresponds to the Forwarding Equivalence Class (FEC) for which fault detection is being performed.

The egress ND sends BFD control packets to the ingress ND, which include an egress discriminator identifying the BFD session for that MPLS LSP at the egress ND. The egress discriminator is used in the "My Discriminator" field of the BFD control packets transmitted from the egress ND towards the ingress ND. In addition, the egress discriminator is added to the "Your Discriminator" field of the BFD control packets transmitted from the ingress ND towards the egress ND for the BFD session. The BFD control packets sent by the egress ND are User UDP packets of which the source IP address is a routable address of the egress ND.

In typical scenarios, multiple BFD sessions associated with multiple MPLS LSPs are established between an ingress ND and an egress ND. In these scenarios, BFD control packets carrying an "UP" state, indicating that the BFD session is still active, are transmitted periodically from the egress ND to the ingress ND. The BFD control packets transmitted for each BFD session are identical to the BFD control packets transmitted for the other sessions except for the egress and the ingress identifiers (e.g., "My Discriminator", "Your Discriminator") of each session. These BFD control packets are forwarded in the same manner, over the same path with the same forwarding treatment for a given egress and ingress ND pair.

Thus, in existing solutions that provide multiple MPLS BFD sessions between two NDs, there is a high consumption of network resources (i.e., computing resources at every node and bandwidth in the network) by these BFD control packets transmitted from the egress ND to the ingress ND. The consumption of network resources can be particularly high when applications require fast failure detection. For example, as indicated in RFC 7419 "Common Interval Support in Bidirectional Forwarding Detection," there is a need for providing very fast control packet transmission interval values (e.g., down to 3.3 msec), which result in fast failure detection, while simultaneously supporting a larger number of BFD sessions between two NDs. For example, for 25 MPLS BFD sessions in UP state (with a detection time of 50 ms), an egress ND needs to send about 1500 packets per second which will consume about 1.2 Mbps bandwidth from the egress ND to the ingress ND.

SUMMARY

Methods and apparatuses for efficiently updating multiple multiprotocol label switching (MPLS) bidirectional forwarding detection (BFD) sessions are described. One general aspect includes a method, in an egress network device, of updating a plurality of multiprotocol label switching (MPLS) bidirectional forwarding detection (BFD) sessions, where each one of the plurality of MPLS BFD sessions is established for a given label switched path (LSP) between an ingress network device and the egress network device of an MPLS network, the method including: responsive to determining that an MPLS BFD session is in an up state, determining whether the MPLS BFD session is part of the plurality of MPLS BFD sessions; and responsive to determining that the MPLS BFD session is part of the plurality of MPLS BFD sessions, transmitting towards the ingress network device a BFD control packet including an ingress group identifier that uniquely identifies the plurality of MPLS BFD sessions at the ingress network device, and where the transmitting the BFD control packet causes an update of a set of two or more of MPLS BFD sessions from the plurality of MPLS BFD sessions identified based on the ingress group identifier.

One general aspect includes an egress network device for updating a plurality of multiprotocol label switching (MPLS) bidirectional forwarding detection (BFD) sessions, where each one of the plurality of MPLS BFD sessions is established for a given label switched path (LSP) between an ingress network device and the egress network device of an MPLS network. The egress network device includes one or more processors; and non-transitory computer readable medium that store instructions, which when executed by the one or more processors cause the egress network device to: responsive to determining that an MPLS BFD session is in an up state, determine whether the MPLS BFD session is part of the plurality of MPLS BFD sessions. The egress network device is further to responsive to determining that the MPLS BFD session is part of the plurality of MPLS BFD sessions, transmit towards the ingress network device a BFD control packet including an ingress group identifier that uniquely identifies the plurality of MPLS BFD sessions at the ingress network device, and where to transmit the BFD control packet causes an update of a set of two or more of MPLS BFD sessions from the plurality of MPLS BFD sessions identified based on the ingress group identifier.

One general aspect includes a method, in an ingress network device, of updating a plurality of multiprotocol label switching (MPLS) bidirectional forwarding detection (BFD) sessions, where each one of the plurality of MPLS BFD sessions is established for a given label switched path (LSP) between the ingress network device and an egress network device (104) of an MPLS network, the method including: receiving a BFD control packet from the egress network device; and in response to determining that a state field of the BFD control packet has an up value, and that a value of an ingress BFD session identifier field of the BFD control packet matches an ingress group identifier uniquely identifying the plurality of MPLS BFD sessions, updating a set of two or more MPLS BFD sessions based on the ingress group identifier.

One general aspect includes an ingress network device for updating a plurality of multiprotocol label switching (MPLS) bidirectional forwarding detection (BFD) sessions, where each one of the plurality of MPLS BFD sessions is established for a given label switched path (LSP) between the ingress network device and an egress network device of an MPLS network, the ingress network device including: one or more processors; and non-transitory computer readable medium that store instructions, which when executed by the one or more processors cause the egress network device to receive a BFD control packet from the egress network device; in response to determining that a state field of the BFD control packet has an up value, and that a value of an ingress BFD session identifier field of the BFD control packet matches an ingress group identifier uniquely identifying the plurality of MPLS BFD sessions, update a set of two or more MPLS BFD sessions based on the ingress group identifier.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for updating multiple Multiprotocol Label Switching (MPLS) Bidirectional Forwarding Detection (BFD) sessions. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Methods and Apparatuses for efficiently updating the states of multiple Multiprotocol Label Switching (MPLS)

Figure 1:
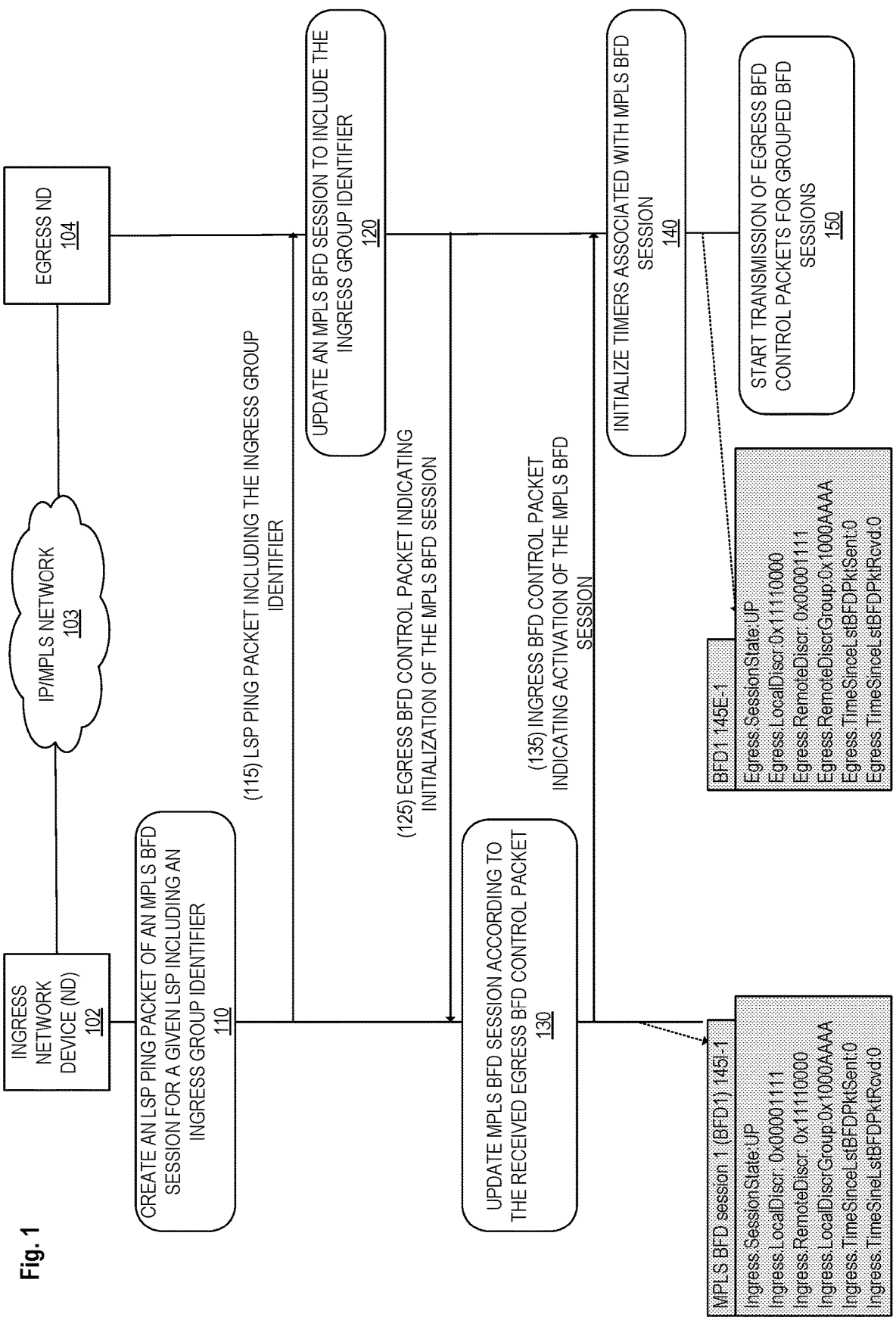
FIG. 1 illustrates a block diagram illustrating exemplary operations for initializing an MPLS BFD session that is part of a group of MPLS BFD session in accordance with some embodiments.

Bidirectional Forwarding Detection (BFD) sessions are described. The embodiments described herein present a solution to reduce the number of periodic BFD control packets transmitted from an egress ND to an ingress ND. The reduction in the number of BFD control packets significantly improves the overall performance of the network by saving processing resources at the nodes traversed by the BFD control packets as well as reducing the consumed bandwidth in the network. The solution introduces the use of a single BFD control packet to indicate the "UP" state of multiple MPLS-BFD sessions between an egress and ingress ND. In one embodiment, a plurality of MPLS BFD sessions are established between an ingress ND and an egress ND of an MPLS network. Each one of the plurality of MPLS BFD sessions is established for a given Label Switched Path (LSP). Responsive to determining that an MPLS BFD session is in an UP state, the egress ND determines whether the MPLS BFD session is part of a plurality of MPLS BFD sessions. In response to determining that the MPLS BFD session is part of the plurality of MPLS BFD sessions, the egress ND transmits towards the ingress network device a BFD control packet including an ingress group identifier that uniquely identifies the plurality of MPLS BFD sessions at the ingress network device. The transmission of this single BFD control packet causes an update of a set of two or more MPLS BFD session the plurality of MPLS BFD sessions identified based on the ingress group identifier. FIG. 1 illustrates a block diagram illustrating exemplary operations for initializing an MPLS BFD session that is part of a group of MPLS BFD session in accordance with some embodiments. FIG. 1 illustrates an Internet Protocol (IP)/MPLS network 103 that includes an ingress network device 102 and an egress network device 104. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). The ingress ND (102) is a Label Switched ND (e.g., a LS Router), which is a starting point (i.e., a source) of a given Label Switched Path (LSP). The egress ND 104 is a Label Switched ND (e.g., a Label Switched Router) that is an end point (i.e., a drain) of a given Label Switched Path (LSP). An LSP is a forwarding path through an MPLS network (e.g., MPLS network 103) set up between two network devices (e.g., ingress ND 102 and egress ND 104). The LSP is set up by a signaling protocol such as Label Distribution Protocol (LDP), Resource Reservation Protocol (RSVP), Border Gateway Protocol (BGP) etc. traffic is forwarded between the ingress ND and the egress ND based on MPLS labels associated with the LSP.

Multiple LSPs are established between the ingress ND 102 and the egress ND 104. Bidirectional Forwarding Detection (BFD) is a protocol designed to provide fast failure detection times for all media types, encapsulations, topologies and routing protocols. BFD is used to provide failure detection in an LSP between the ingress ND 102 and the egress ND 104. In order to detect failure of multiple LSPs, a BFD session is established for each one of the LSPs. These BFD sessions are referred to as MPLS BFD session. Each MPLS BFD session is operative to detect failure of a Label Switched Path between ingress ND 102 and egress ND 104.

Figure 2:
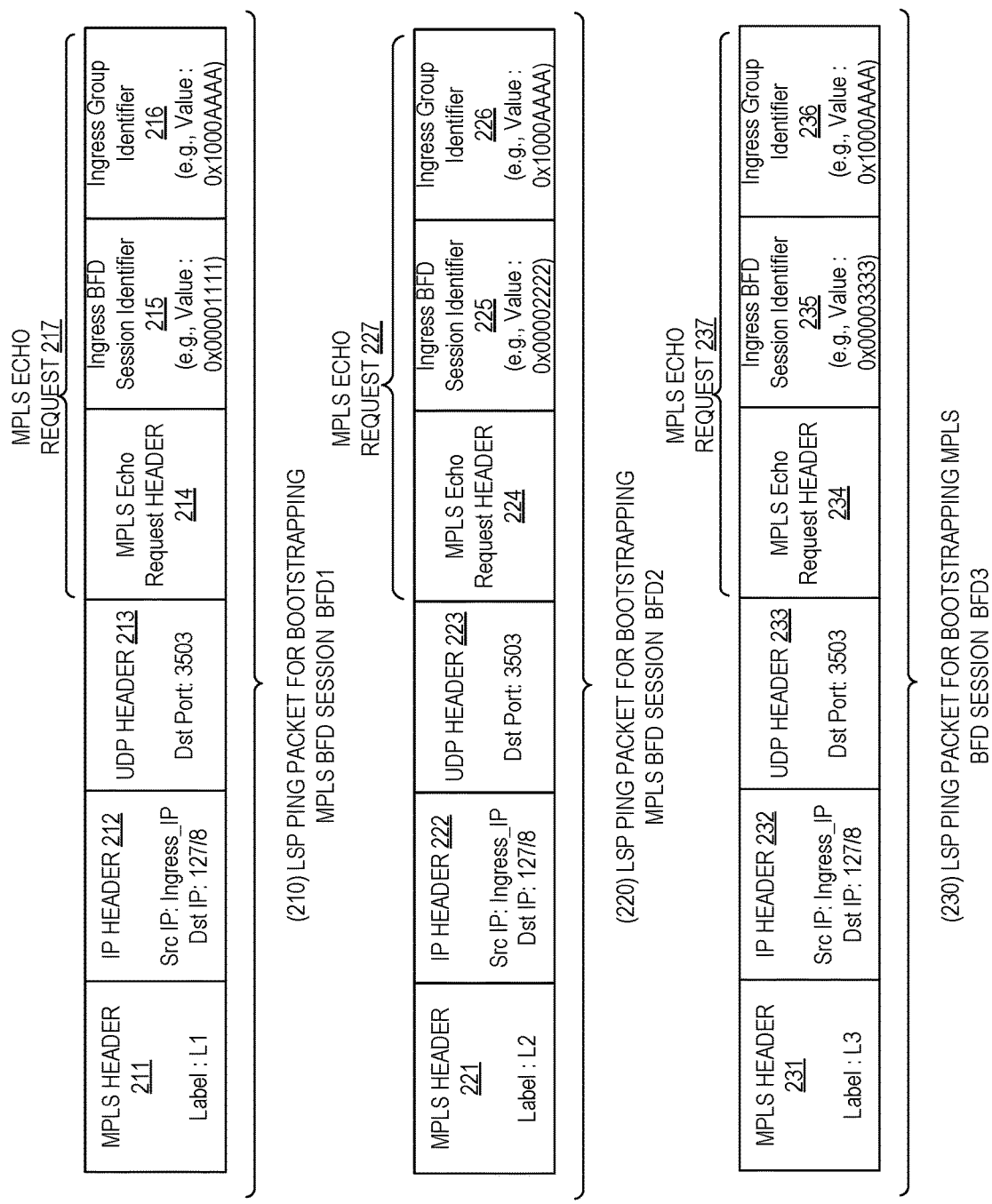
FIG. 2 illustrates exemplary LSP Ping packets for respective MPLS BFD sessions in accordance with some embodiments.

For each MPLS BFD session to be established between the ingress ND 102 and the egress ND 104, at operation 110, the ingress ND 102 creates an LSP Ping Packet including an ingress group identifier. The ingress group identifier uniquely identifies, at the ingress network device, multiple MPLS BFD sessions that are established between the ingress ND 102 and the egress ND 104. FIG. 2 illustrates exemplary LSP Ping packets for respective MPLS BFD sessions in accordance with some embodiments. While FIG. 2 illustrates three exemplary LSP Ping Packets used for establishing three respective MPLS BFD sessions, where each MPLS BFD session is used to detect failure of a distinct LSP, the embodiments are not so limited and any number of MPLS BFD sessions can be established between the two NDs 102 and 104. FIG. 2 illustrates a first LSP Ping packet 210, a second LSP Ping packet 220, and a third LSP Ping packet 230. Each of the LSP Ping packets 210-230 includes a respective MPLS header 211, 221, and 231. The MPLS header includes an MPLS Label value (L1, L2 or L3) associated with the LSP on which the LSP Ping packets is to be transmitted and for which the MPLS BFD session is to be established. The LSP Ping packets 210-230 includes respective IP header 212, 222, 232 and UDP headers 213, 223, 233 (e.g., with a destination port 3503). Each of the IP header includes a routable IP address of the ingress ND 102 as a source address.

Each one of the LSP Ping packets 210-230 is used to bootstrap a separate MPLS BFD session and transmit an MPLS Echo Request 217, 227, and 237. The MPLS Echo request includes an MPLS Echo request header (214, 224, and 234), an ingress BFD session Identifier 215, 225, and 235. The ingress BFD identifier uniquely identifies the MPLS BFD session to be established. The ingress BFD identifier is used at the ingress ND to identify the MPLS BFD session. An MPLS BFD session is identified with two identifier an ingress identifier and an egress identifier. The ingress BFD identifier is used at the ingress ND 102 to uniquely identify the MPLS BFD session and distinguish it from other MPLS BFD sessions established at the ingress ND. The egress BFD identifier is used at the egress ND 104 to uniquely identify the MPLS BFD session and distinguish it from other MPLS BFD sessions established at the egress ND. Each of these identifiers has a nonzero value that is unique across all BFD sessions on this system. For example, in the packet 210, the ingress BFD session identifier 215 may have an exemplary value of 0x00001111, while the ingress BFD session identifier 225 of packet 220 has a value of 0x00002222, and the ingress BFD session identifier 235 of packet 230 has a value of 0x00003333. Each of these identifier (215, 225 and 235) uniquely identifies an MPLS BFD session. In some embodiments, the ingress BFD session identifier is used by the egress network device in a field of periodic BFD control packets transmitted to the ingress ND for updating a single MPLS BFD session.

The LSP Ping packets further include respective Ingress Group Identifier (G_ID) 216, 226 and 236. The G_IDs uniquely identify a set of MPLS BFD sessions between ND 102 and ND 104. As will be discussed in further details below, the G_IDs are used by the egress ND (as a value in "Your Discriminator" field of periodic BFD control packets) to update the set of MPLS BFD sessions based on a single BFD control packet instead of transmitting individual BFD control packets for each one of the MPLS BFD sessions that are part of the group. In some embodiments, the ingress group identifier is a packet of type TLV (Type, Length, Value). The format of this TLV can have the same format as the one used for the ingress BFD session identifier, including a 4-byte value that identifies the group to which the MPLS BFD Session belong. For example, each one of the LSP Ping packets 210, 220 and 230 includes a G_ID with a value of "0x1000AAAA").

Referring back to FIG. 1, at operation 115, the LSP Ping Packet (e.g., LSP Ping packet 210) including the ingress group identifier is transmitted to the egress ND 104. At operation 120 the egress ND '04 updates an MPLS BFD session to include the ingress group identifier. At operation 125, the egress ND 104 transmits an egress BFD control packet indicating initialization of the MPLS BFD session. The egress BFD control packet further includes additional information regarding the MPLS BFD session such as an egress BFD session identifier (which uniquely identifies the BFD session at the egress ND), a desired minimum time interval (which defines the time interval between consecutive BFD control packets), etc. At operation 130, the ingress ND 102 updates the MPLS BFD session according to the received egress BFD control packet and transmits at operation 135 an ingress BFD control packet indicating activation of the MPLS BFD session. Upon receipt of the ingress BFD control packet, the egress ND 104 initialize the timers associated with the MPLS BFD session 140 and starts (operation 150) transmission of BFD control packets (which may be referred to as keep-alives packets) that confirm liveliness of the MPLS BFD session (and consequently of the LSP).

Following the update of the MPLS BFD session at the ingress ND 102, the ND includes a record (145I-1) of the MPLS BFD session 1 (BFD1) updated to indicate that the session in an UP state (indicating that the session is active and no failure has been detected). The record further includes an ingress BFD session identifier (e.g., Ingress.LocalDiscr:0x00001111), an egress BFD session identifier (e.g., Ingress.RemoteDiscr:0x11110000), and a first and second timers. A first timer recording a time since the last BFD control packet was sent from the ingress ND 102 (Ingress.TimeSinceLstBFDPktSent), which is initialized at 0 each time a BFD control packet is sent. A second timer recording a time since the last BFD control packet was received from the egress ND 104 (Ingress.TimeSinceLstBFDPktRcvd), which is initialized at 0 each time a BFD control packet is received from the egress ND 104. The record further includes an ingress group identifier (Ingress.LocalDiscrGroup, with an exemplary value 0x1000AAAA).

Following the receipt of the ingress BFD control packet at operation 135, the egress ND 104 updates a record (145E-1) of BFD1 to indicate that the session is in an UP state (indicating that the session is active and no failure has been detected). The record 145E-1 further includes an ingress BFD session identifier (e.g., Egress.RemoteDiscr:0x00001111), an egress BFD session identifier (e.g., Egress.LocalDiscr:0x11110000), and a first and second timers. A first timer recording a time since the last BFD control packet was sent from the egress ND 104 (Egress.TimeSinceLstBFDPktSent), which is initialized at 0 each time a BFD control packet is sent. A second timer recording a time since the last BFD control packet was received from the ingress ND 102 (Egress.TimeSinceLstBFDPktRcvd), which is initialized at 0 each time a BFD control packet is received from the ingress ND 102. The record further includes an ingress group identifier (Egress.RemoteDiscrGroup, with an exemplary value 0x1000AAAA).

While, in FIG. 1, each one of the records 145I-1 and 145E-1 include the following parameters: 1) a state of the BFD session (which can have any of the following values: "Init"-indicating an initialization state, "UP"—indicating that the session is active, "DOWN"-indicating that the session is no longer active, and "ADMINDOWN"—indicating that the session has been shut down by an administrator); 2) an ingress BFD session identifier (i.e., Egress.RemoteDiscr: 0x00001111 and Ingress.LocalDiscr: 0x00001111) identifying the BFD session at the ingress network device; 3) an egress BFD session identifier (i.e., Ingress.RemoteDiscr: 0x00001111 and Egress.LocalDiscr: 0x00001111); 4) an ingress group identifier identifying a group of MPLS BFD sessions to which the BFD1 session belongs (Egress.RemoteDiscrGroup:0x1000AAAA and Ingress.LocalDiscrGroup:0x1000AAAA); 5) a first timer indicating a time since the last BFD control packet received at the network device (e.g., Egress.TimeSinceLstBFDPktRcvd:0 and Ingress.TimeSinceLstBFDPktRcvd:0); and 6) a second timer indicating a time since the last BFD control packet was sent by the device (e.g., Egress.TimeSinceLstBFDPktSent:0 and Ingress.TimeSinceLstBFDPktSent:0), the embodiments are not so limited, and the records may include additional parameters associated with the MPLS BFD session which are not illustrated in the figure. For example, a record may further include 1) a minimum time interval, in microseconds, between transmitted BFD control packets that this system uses; 2) a source IP address of a device, and 3) a destination IP address of the remote network device, etc.

The operations in the flow diagrams of FIGS. 3-4 will be described with reference to the exemplary embodiments of FIGS. 1-2. However, it should be understood that the operations of the flow diagrams can be performed by embodiments of the invention other than those discussed with reference to FIGS. 1-2, and the embodiments of the invention discussed with reference to FIGS. 1-2 can perform operations different than those discussed with reference to the flow diagrams.

Figure 3:
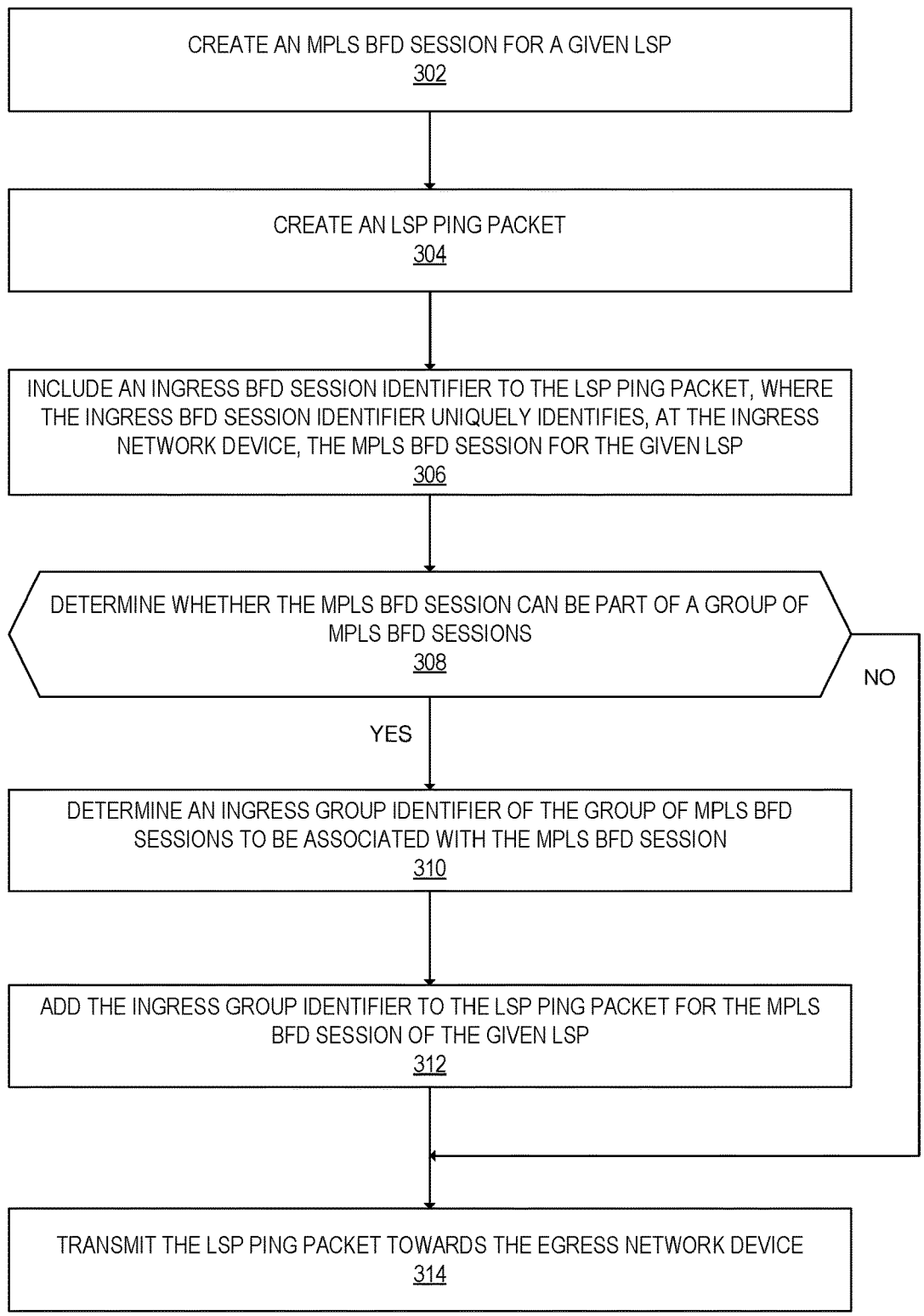
FIG. 3 illustrates an exemplary flow diagram of operations performed in an ingress network device for establishing an MPLS BFD session in accordance with some embodiments.

FIG. 3 illustrates an exemplary flow diagram of operations performed in an ingress network device for establishing an MPLS BFD session in accordance with some embodiments. At operation 302, the ingress network device 102 creates an MPLS BFD session for a given LSP. At operation 304, the ingress network device 102 creates an LSP Ping packet (e.g., packet 210, 220 or 230). At operation 306, the ingress ND 102 includes an ingress BFD session identifier (e.g., Ingress BFD session identifiers 215-235) to the LSP Ping Packet. The ingress BFD session identifier uniquely identifies at the ingress network device, the MPLS BFD session for the given LSP. At operation 308, the ingress ND 102 determines whether the MPLS BFD session can be part of a group of MPLS BFD sessions. In some embodiments, the determination can be performed based on a configuration parameter indicating that the MPLS BFD session may be part of a group. For example, upon configuration of the MPLS BFD session an administrator may assign a group identifier to the session. In other embodiments, the ingress ND 102 is operative to include the session in a group of MPLS BFD sessions. For example, the ingress ND may define several groups in which to separate multiple MPLS BFD sessions. Upon determination that the MPLS BFD session can be part of a group of MPLS BDF sessions, the ingress ND 102 determines (at operation 310) an ingress group identifier to be associated with the MPLS BFD session. Flow then moves to operation 312, at which the ingress ND 102 adds the ingress group identifier to the LSP Ping packet (e.g., packet 210, 220, 230) for the MPLS BFD session of the given LSP. Alternatively, if the ingress ND 102 determines that the BFD session cannot be part of a group of MPLS BFD sessions, an ingress group identifier is not added to the LSP Ping packet and flow moves to operation 314. At operation 314, the ND 102 transmits the LSP Ping packet towards the egress network device 104.

Figure 4:
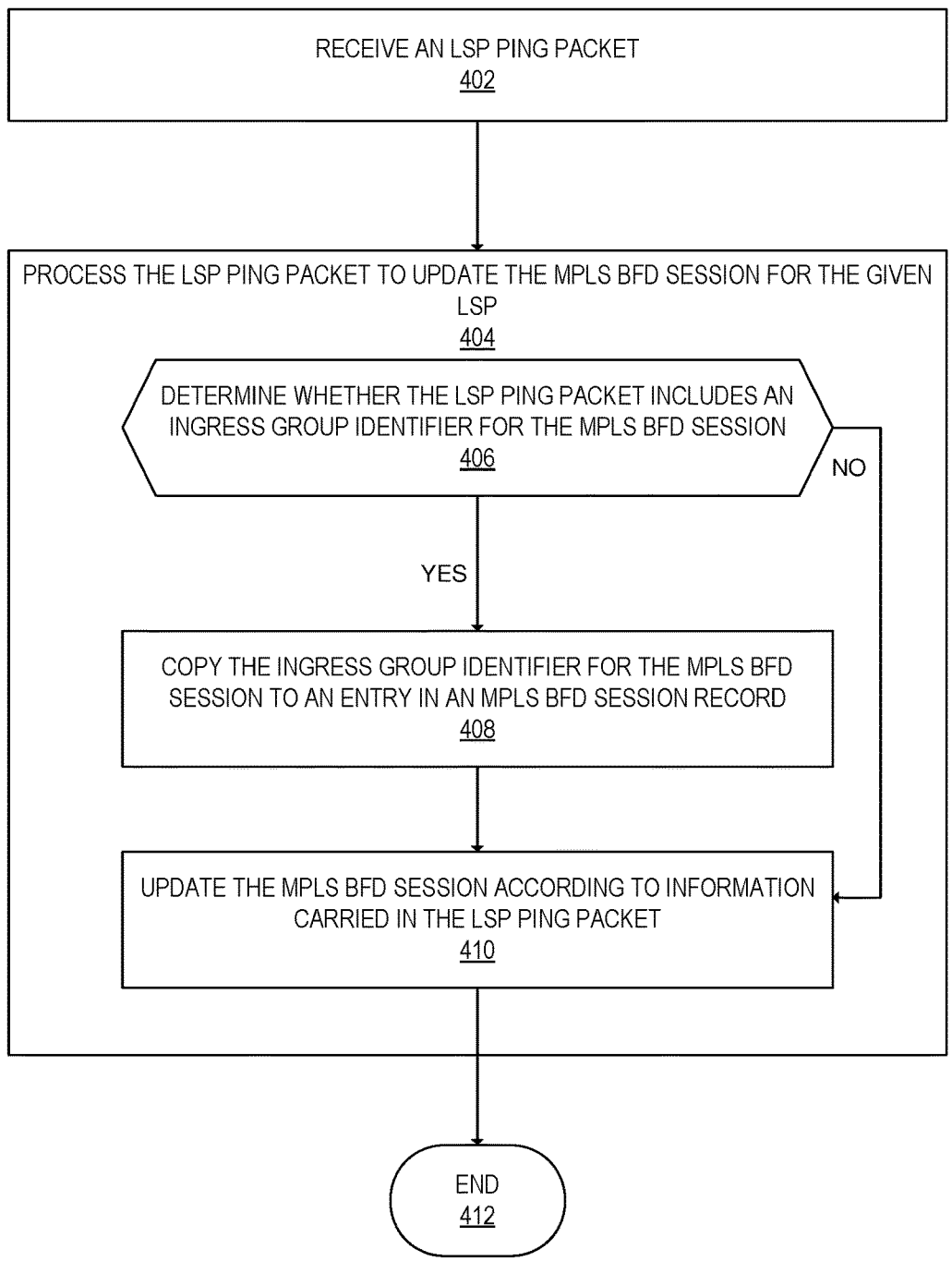
FIG. 4 illustrates an exemplary flow diagram of operations performed in an egress network device for establishing an MPLS BFD session in accordance with some embodiments.

FIG. 4 illustrates an exemplary flow diagram of operations performed in an egress network device for establishing an MPLS BFD session in accordance with some embodiments. At operation 402, the egress ND 104 receives an LSP Ping packet. At operation 404, the egress ND 104 process the LSP ping packet to update the MPLS BFD session for the given LSP. When processing the LSP Ping packet, the ND 104 determines (operation 406) whether the packet includes an ingress group identifier for the MPLS BFD session. If the packet includes the ingress group identifier (e.g., 216, 226, 236), flow moves to operation 408, at which the ND 104 copies the ingress group identifier to an entry of an MPLS BFD session record (e.g., 145E-1) flow then moves to operation 410. If the packet does not include the ingress group identifier, flow moves to operation 410. At operation 410, the ND 104 updates the MPLS BFD session according to information carried in the LSP ping packet (e.g., an ingress BFD session identifier is updated). In some embodiments, the update of the MPLS BFD session includes updating a record associated with the MPLS BFD session for the LSP.

Figure 5:
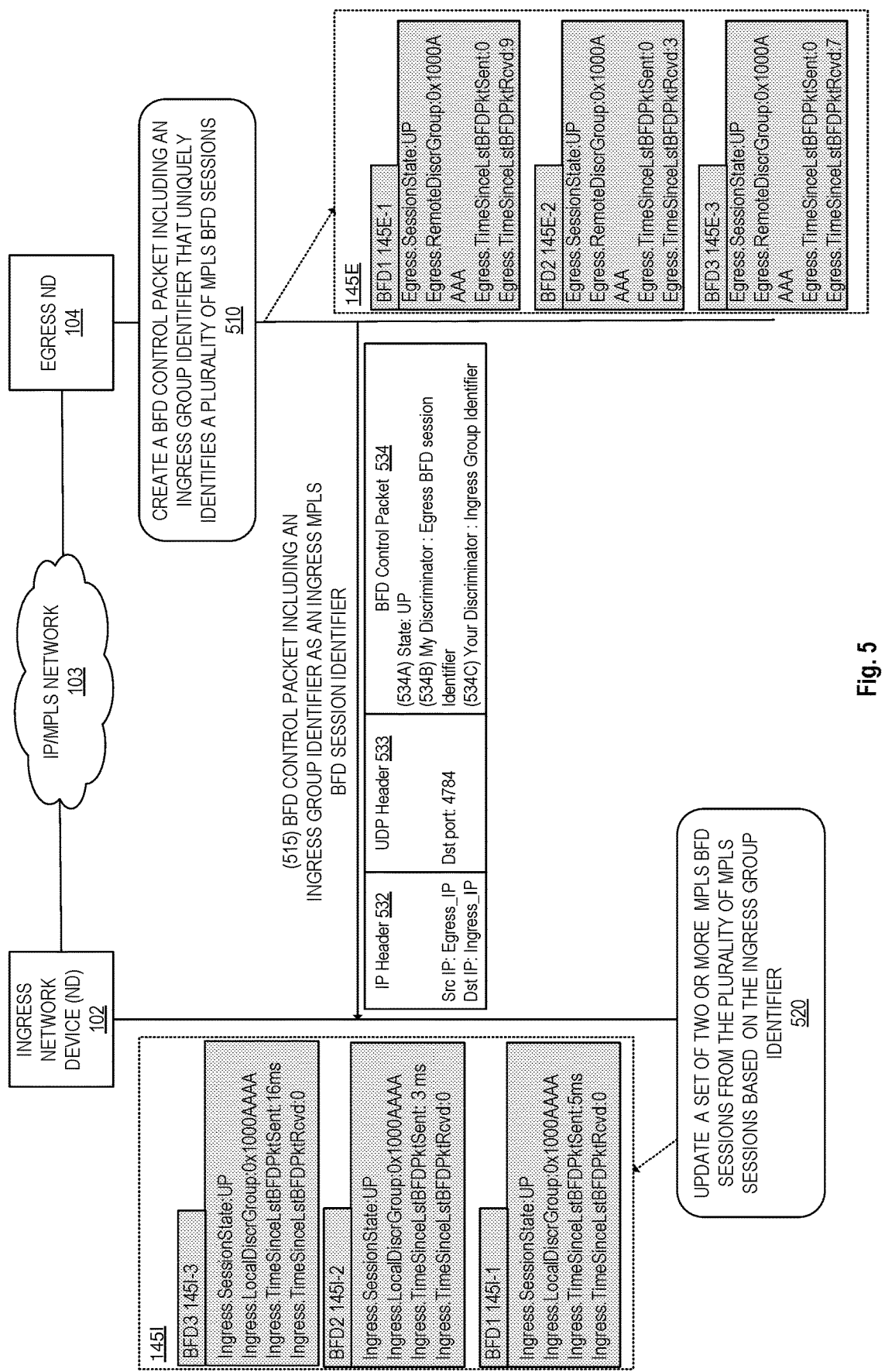
FIG. 5 illustrates a block diagram of exemplary operations for transmitting a single BFD control packets for a group of MPLS BFD sessions in accordance with some embodiments.

FIG. 5 illustrates a block diagram of exemplary operations for transmitting a single BFD control packets for a group of MPLS BFD sessions in accordance with some embodiments. Once multiple MPLS BFD sessions between ND 102 and ND 104 are established and their state is set to an "UP" state indicating that the MPLS BFD sessions are active, each of the NDs 102 and 104 transmits periodic BFD control packets to update the liveliness of the BFD session. For example, referring back to the example of FIG. 2, three sessions are established between ND 102 and ND 104 (e.g., BFD1, BFD2 and BFD3). In conventional systems using MPLS BFD for failure detection, an egress ND would periodically transmit, to the ingress ND, BFD control packets for each one of the BFD sessions separately. In contrast to the conventional systems, the egress network device 104 creates, at operation 510, a BFD control packet including an ingress group identifier that uniquely identifies a plurality of MPLS BFD sessions. The BFD control packet is transmitted (operation 515) towards the ingress ND 102. The BFD control packet 534 includes a header field indicating a state 534A of the MPLS BFD sessions, an egress BFD session identifier 534B (which may be referred to as "My Discriminator"), and an ingress BFD session identifier 534C (which may be referred to as "Your Discriminator"), where the ingress BFD session identifier includes the ingress group identifier. Upon receipt of the BFD control packet, the ND 102 updates a set of two or more MPLS BFD sessions from the plurality of MPLS sessions based on the ingress group identifier. The update of the MPLS BFD sessions causes an update of the respective records of the sessions stored at the ingress ND 102.

The operations in the flow diagrams of FIGS. 6-7 will be described with reference to the exemplary embodiments of FIG. 5. However, it should be understood that the operations of the flow diagrams can be performed by embodiments of the invention other than those discussed with reference to FIG. 5, and the embodiments of the invention discussed with reference to FIG. 5 can perform operations different than those discussed with reference to the flow diagrams.

Figure 6:
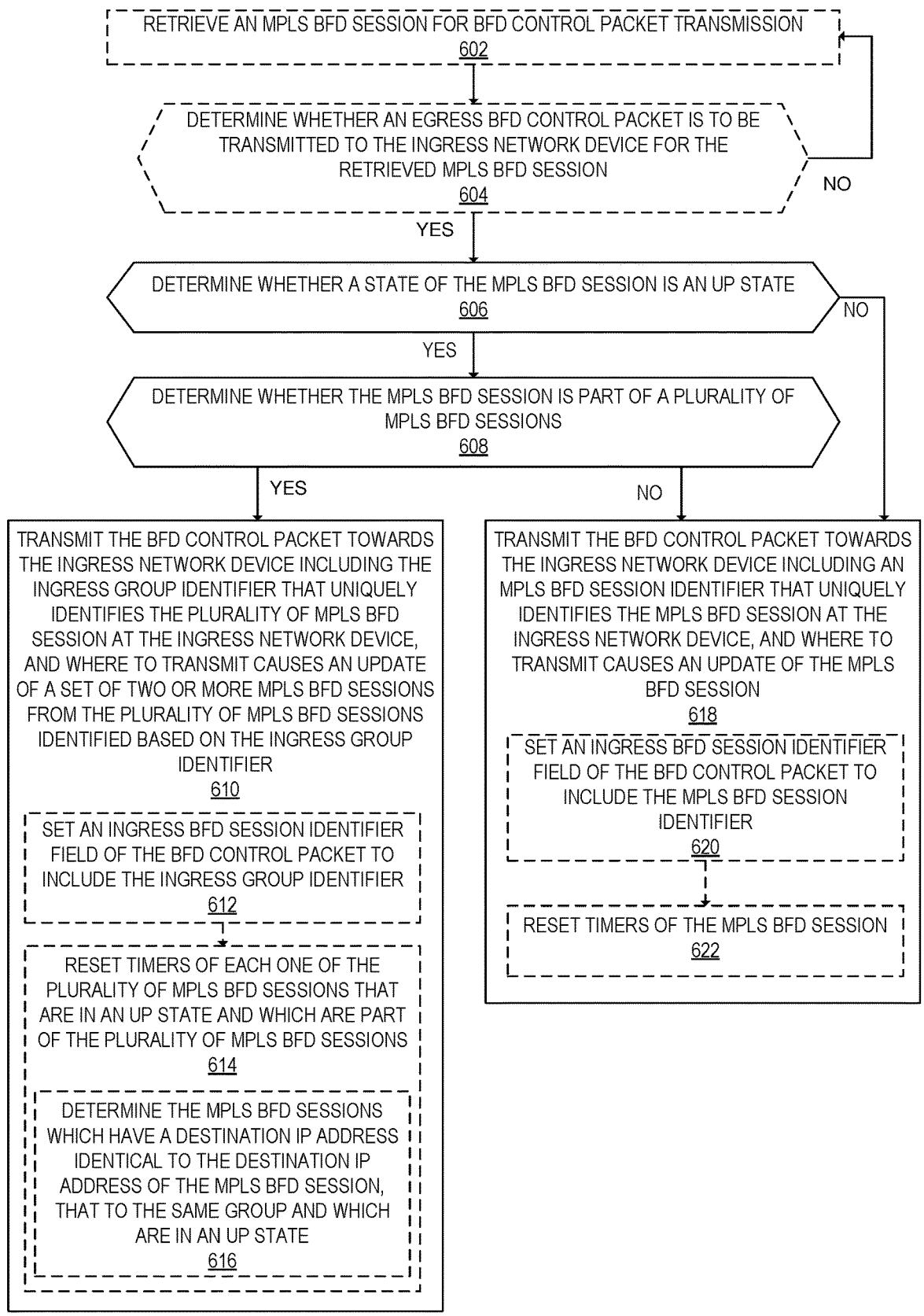
FIG. 6 illustrates a flow diagram of exemplary operations for transmitting a BFD control packet including an ingress group identifier in accordance with some embodiments.

FIG. 6 illustrates a flow diagram of exemplary operations for transmitting a BFD control packet including an ingress group identifier in accordance with some embodiments. Following the establishment of multiple MPLS BFD sessions (e.g., BFD1, BFD2, BFD3), the egress ND 104 initiates the periodic transmission of BFD control packets to update the liveliness of the MPLS BFD session. In some embodiments, the transmission of the control packets is performed following the receipt of an LSP Ping packet for each one of the sessions (as described with reference to FIGS. 1-4) and the initialization of the timers of the MPLS BFD session. At operation 602, ND 104 retrieves an MPLS BFD session for BFD control packet transmission. Flow moves to operation 604, at which the ND 104 determines whether an egress BFD control packet is to be transmitted to the ingress ND for the retrieved BFD session. ND 104 determines whether a time since the last packet sent for this given MPLS BFD session is greater or equal than the maximum value between a desired minimum transmission interval and the remote minimum receipt interval. If the ND 104 determines that a packet is not to be transmitted, the flow of operations moves back to operation 602 at which a next BFD session is retrieved and process restarts again. If the ND 104 determines that a BFD control packet is to be transmitted to the ingress ND 102, flow moves to operation 606.

At operation 606, ND 104 determines whether a state of the MPLS BFD session is an UP state, indicating that the MPLS BFD session is active. Responsive to determining (at operation 606) that an MPLS BFD session is in an up state, the ND 104 determines (at operation 608) whether the MPLS BFD session is part of the plurality of MPLS BFD sessions. For example, the ND 104 may determine whether the MPLS BFD session was configured to be part of a group of MPLS BFD sessions. In another embodiments, the ND 104 may assign the MPLS BFD session to be part of a group of MPLS BFD sessions.

Responsive to determining that the MPLS BFD session is part of a plurality of MPLS BFD sessions, ND 104 transmits (operation 610) towards the ingress network device (102) a BFD control packet (534) including an ingress group identifier (534C) that uniquely identifies the plurality of MPLS BFD sessions at the ingress network device (ND 102), and where to transmit the BFD control packet (534) causes an update of a set of two or more of MPLS BFD sessions from the plurality of MPLS BFD sessions identified based on the ingress group identifier.

In some embodiments, transmitting the BFD control packet (534) includes setting (operation 612) an ingress BFD session identifier field of the BFD control packet to include the ingress group identifier. Referring back to the example of BFD1, BFD2, and BFD3, the ingress BFD session identifier may be set to the exemplary value "0x1000AAAA" assigned to the group formed by the three BFD sessions. The BFD control packet includes as the identifier of the remote ND (i.e., "Your Discriminator" field), the ingress group identifier. Thus in contrast to conventional approaches in which the ingress BFD session identifier field of the BFD control packet includes an identifier that uniquely identifies a single MPLS BFD session, the ingress group identifier identifies two or more MPLS BFD sessions. Thus, a single BFD control packet is used to cause the update of two or more MPLS BFD sessions, typically the packet can be used to update a higher number of MPLS BFD sessions (10s to 1000s of sessions). While the embodiments described herein describe a group of MPLS BFD session of 3, one would understand that the invention is not so limited and any number of MPLS BFD sessions can be grouped and identified with a single ingress group identifier.

At operation 614, the ND 104 reset timers of each one of the plurality of MPLS BFD sessions that are in an up state and which are part of group of MPLS BFD sessions identified with the ingress group identifier. For example, when referring to FIG. 5, the ND 104 transmits a BFD control packet 534 including an ingress group identifier associated with the three BFD sessions BFD1, BFD2 and BFD3. When the message is transmitted the ND 104 resets the timers indicating the time since the last packet was sent. Thus as illustrated in each record 145E-1-145E-3, the timers (for last packet sent "Egress.TimeSinceLstBFDPktSent") are reset to 0. In some embodiments, prior to resetting the timers of each BFD sessions, ND 104 determines whether the MPLS BFD sessions has the same destination IP address as the selected BFD session, that it belongs to the same group of MPLS BFD sessions and that it is still in an UP state. Following this determination, the ND 104 may reset the timers indicating that BFD control packet being sent will update at the ingress network all the BFD sessions that are in an UP state (i.e., which are still active) and which belong to the same group.

Responsive to determining that the MPLS BFD session is not part of a plurality of MPLS BFD sessions (i.e., is not part of a group of MPLS BFD sessions), the flow moves to operation 618 at which the ND 104 transmits towards the ingress network device (102) a BFD control packet including an MPLS BFD session identifier that uniquely identifies the MPLS BFD session at the ingress network device. For example, referring back to FIG. 2, if the selected BFD session is BFD1, the BFD control packet includes an identifier of BFD1 defined in the filed Ingress BFD session identifier 215 (e.g., with an exemplary value 0x00001111). The transmission of this control packet causes an update of the MPLS BFD session only.

In some embodiments, transmitting the BFD control packet includes setting (operation 620) an ingress BFD session identifier field of the BFD control packet to include the MPLS BFD session identifier. In this case, the single BFD control packet is used for the update of a single MPLS BFD session.

At operation 622, the ND 104 reset a timer of the MPLS BFD session. When the message is transmitted the ND 104 resets the timer indicating the time since the last packet was sent.

Figure 7:
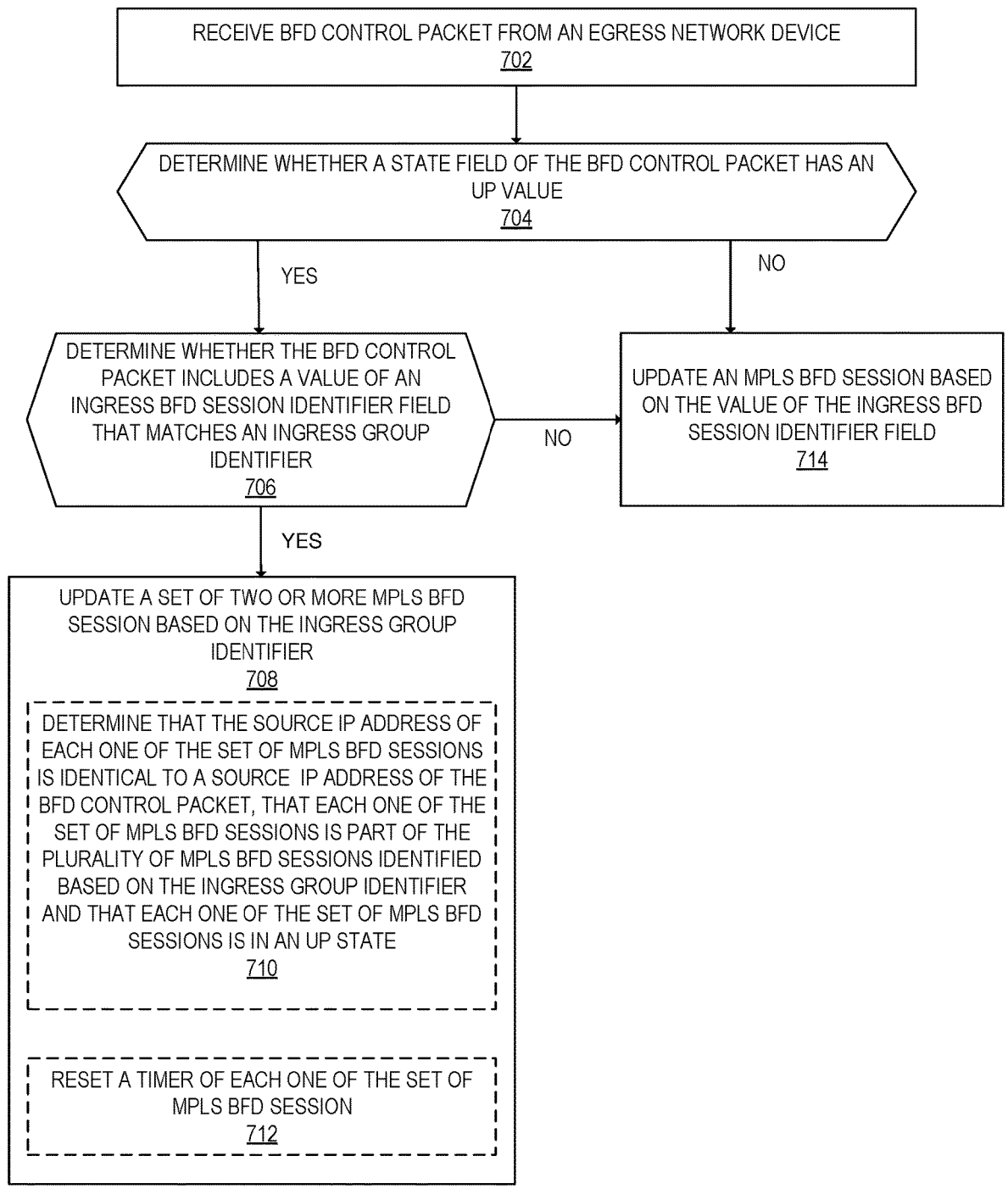
FIG. 7 illustrates a flow diagram of exemplary operations for receiving a BFD control packet including an ingress group identifier in accordance with some embodiments.

FIG. 7 illustrates a flow diagram of exemplary operations for receiving a BFD control packet including an ingress group identifier in accordance with some embodiments. At operation 702, a BFD control packet is received from the egress network device 104. At operation 704, the ND 102 determines whether a state field of the BFD control packet has an "UP" value, indicating that the received packet is to be used for updating an active BFD session. If the BFD control packet does not have an UP state, the flow moves to operation 714, at which the ND 102 updates a single MPLS BFD session. The MPLS BFD session to be updated is identified based on the ingress BFD session identifier field of the BFD control packet. Referring back to FIG. 2, when the BFD control packet received includes in the "Your Discriminator" field an identifier of BFD1 (e.g., 0x00001111), the ND 102 updates BFD1 only.

Alternatively when the BFD control packet has an UP state, the flow of operations moves to operation 706, at which the ND 102 determines whether the BFD control packet includes a value of an ingress BFD session identifier field that matches an ingress group identifier. If the BFD control packet does not include in ingress group identifier, the flow moves to operation 714, were the packet is used to update a single MPLS BFD session. When the BFD control packet includes an ingress group identifier, the flow moves to operation 708 at which the ND 102 updates a set of two or more MPLS BFD sessions based on the ingress group identifier. For example, referring back to FIG. 2, when the BFD control packet received includes in the "Your Discriminator" field an identifier of the ingress group (e.g., 0x1000AAAA), the ND 102 updates all the BFD sessions.

In some embodiments, the ND 102 determines whether the source IP address of each one of the set of MPLS BFD sessions is identical to the source IP address of the BFD control packet, that the MPLS BFD sessions are part of the group of MPLS BFD session identified with the ingress group identifier and that these sessions are in an UP state. In other words in some embodiments, upon receipt of a BFD control packet with an ingress group identifier, the ND 102 updates a subset of the MPLS BFD sessions of the group. This subset includes the sessions that are already in an UP state and which have the same source IP address. In some embodiments the subset of MPLS BFD sessions may be the entire group of sessions, while in other embodiments, the subset may be smaller than the entire group of sessions. For example, some sessions from the group of sessions may be in a "DOWN" state and may not be updated with the receipt of a group BFD control packet. Once the set of MPLS BFD sessions to be updated is determined, ND 102 resets (operation 712) a timer of each session from the set of MPLS BFD sessions. For example, referring back to FIG. 5, when the BFD control packet 534 is received, ND 102, determines that the packets includes an UP state (534A), and an ingress group identifier (534C), which causes the update of the three BFD sessions BFD1, BFD2, and BFD3. Given, that each session is in an UP state at the ingress ND, ND 102 resets the timers indicating the time since the last BFD packet was received (Ingress.TimeSinceLstBFDPktRcvd) for each one of the MPLS BFD sessions. Thus BFD sessions records (145I-1, 145I-2, and 145I-3) of each one of the sessions are updated with reset timers.

While, in FIG. 5, each record from the set of records 145I and 145E includes the following parameters: 1) a state of the BFD session (which can have any of the following values: "Init"—indicating an initialization state, "UP"—indicating that the session is active, "DOWN"—indicating that the session is no longer active, and "ADMINDOWN"—indicating that the session has been shut down by an administrator); 2) an ingress group identifier identifying a group of MPLS BFD sessions (Egress.RemoteDiscrGroup: 0x1000AAAA and Ingress.LocalDiscrGroup: 0x1000AAAA); 3) a first timer indicating a time since the last BFD control packet received at the network device (e.g., Egress.TimeSinceLstBFDPktRcvd and Ingress.TimeSince-LstBFDPktRcvd); and 4) a second timer indicating a time since the last BFD control packet was sent by the device (e.g., Egress.TimeSinceLstBFDPktSent and Ingress.TimeS-inceLstBFDPktSent), the embodiments are not so limited, and the records may include additional parameters associated with the MPLS BFD session which are not illustrated in the figure. For example, a record may further include 1) a minimum time interval, in microseconds, between transmitted BFD control packets that this system uses; 2) a source IP address of a device, 3) a destination IP address of the remote network device, 4) an ingress BFD session identifier (i.e., Egress.RemoteDiscr and Ingress.LocalDiscr) identifying the BFD session at the ingress network device; 5) an egress BFD session identifier (i.e., Ingress.RemoteDiscr and Egress.LocalDiscr); etc. In some embodiments, the records may be stored in a computer readable medium of each respective ND, and/or stored on another network device communicatively coupled with the egress or ingress ND.

Embodiments for updating multiple MPLS BFD sessions with a single BFD control packets have been described. The embodiments described herein present a solution to reduce the number of periodic BFD control packets transmitted from an egress ND to an ingress ND. The reduction in the number of BFD control packets significantly improves the overall performance of the network by saving processing resources at the nodes traversed by the BFD control packets as well as reducing the consumed bandwidth in the network. The solution introduces the use of a single BFD control packet to indicate the "UP" state of multiple MPLS-BFD sessions between an egress and ingress ND. For example, in a scenario as described above (with 3 BFD sessions), the bandwidth consumption by BFD packets transmitted from an egress network device carrying the 'UP' state for 3 MPLS-BFD sessions (with a detection time of 50 ms and detect multiplier of 3) is reduced to 48 Kbps instead of 144 Kbps (in conventional MPLS BFD).

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 8A:
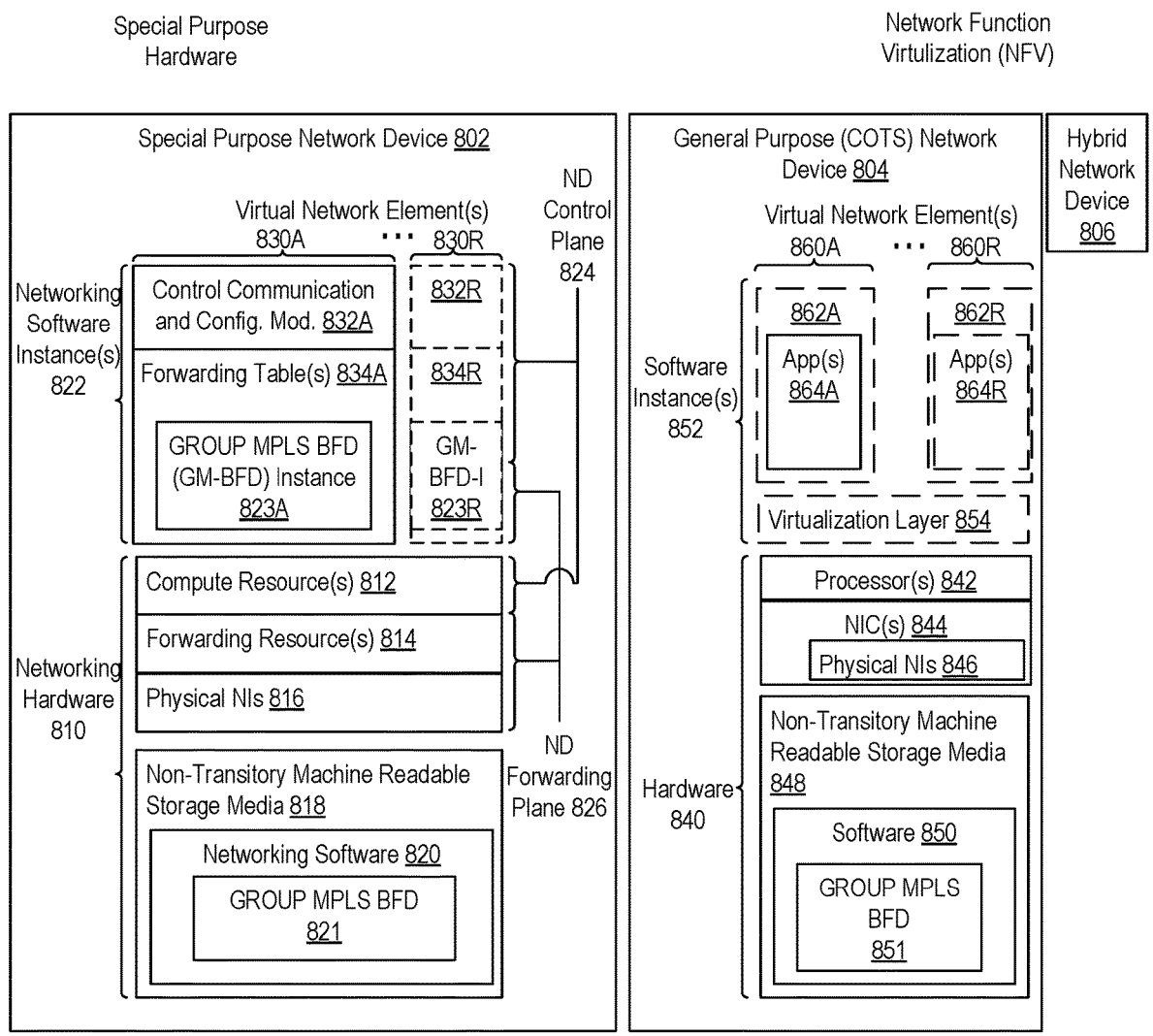
FIG. 8A illustrates connectivity between network devices (NDs) within an exemplary network, as well as three exemplary implementations of the NDs, according to some embodiments of the invention.

FIG. 8A illustrates three exemplary implementations of the NDs, according to some embodiments of the invention. These NDs are physical devices, and the connectivity between these NDs can be wireless or wired (often referred to as a link).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
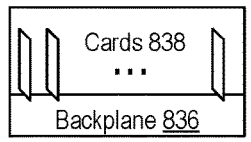
FIG. 8B illustrates an exemplary way to implement a special-purpose network device according to some embodiments of the invention.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/

Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the NIC(s) 844, as well as optionally between the instances 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID). Ingress network device 102 and egress network device 104 are network virtualization edges.

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, in an egress network device, of updating a plurality of Multiprotocol Label Switching (MPLS) Bidirectional Forwarding Detection (BFD) sessions, wherein each one of the plurality of MPLS BFD sessions is established for a given Label Switched Path (LSP) between an ingress network device and the egress network device of an MPLS network, the method comprising:

responsive to determining that an MPLS BFD session is in an up state, determining whether the MPLS BFD session is part of the plurality of MPLS BFD sessions; and responsive to determining that the MPLS BFD session is part of the plurality of MPLS BFD sessions, transmitting towards the ingress network device a BFD control packet including an ingress group identifier that uniquely identifies the plurality of MPLS BFD sessions at the ingress network device, and wherein transmitting the BFD control packet causes an update of a set of two or more of MPLS BFD sessions from the plurality of MPLS BFD sessions identified based on the ingress group identifier.

2. The method of claim 1, wherein transmitting the BFD control packet includes setting an ingress BFD session identifier field of the BFD control packet to include the ingress group identifier.

3. The method of claim 2, wherein transmitting the BFD control packet further includes resetting timers of each one of the plurality of MPLS BFD sessions that are in an up state and which are part of the plurality of MPLS BFD sessions identified with the ingress group identifier.

4. The method of claim 1, wherein the MPLS BFD session is a first session and the BFD control packet is a first BFD control packet, and the method further comprises:

responsive to determining that a second MPLS BFD session is not in an up state or that it is not part of the plurality of MPLS BFD sessions, transmitting a second BFD control packet towards the ingress network device including an MPLS BFD session identifier that uniquely identifies the second MPLS BFD session at the ingress network device, wherein Ma transmitting the second BFD control packet causes an update of the second MPLS BFD session.

5. The method of claim 4, wherein transmitting the second BFD control packet includes setting an ingress BFD session identifier field of the second BFD control packet to include the MPLS BFD session identifier.

6. An egress network device for updating a plurality of Multiprotocol Label Switching (MPLS) Bidirectional Forwarding Detection (BFD) sessions, wherein each one of the plurality of MPLS BFD sessions is established for a given Label Switched Path (LSP) between an ingress network device and the egress network device of an MPLS network, the egress network device comprising:

one or more processors; and non-transitory computer readable medium that store instructions, which when executed by the one or more processors, cause the egress network device to:

responsive to determining that an MPLS BFD session is in an up state, determine whether the MPLS BFD session is part of the plurality of MPLS BFD sessions, and responsive to determining that the MPLS BFD session is part of the plurality of MPLS BFD sessions, transmit towards the ingress network device a BFD control packet including an ingress group identifier that uniquely identifies the plurality of MPLS BFD sessions at the ingress network device, and wherein transmitting the BFD control packet causes an update of a set of two or more of MPLS BFD sessions from the plurality of MPLS BFD sessions identified based on the ingress group identifier.

7. The egress network device of claim 6, wherein to transmit the BFD control packet includes to set an ingress BFD session identifier field of the BFD control packet to include the ingress group identifier.

8. The egress network device of claim 7, wherein to transmit the BFD control packet further includes to reset timers of each one of the plurality of MPLS BFD sessions that are in an up state and which are part of the plurality of MPLS BFD sessions identified with the ingress group identifier.

9. The egress network device of claim 6, wherein the MPLS BFD session is a first session and the BFD control packet is a first BFD control packet, and the egress network device is further to:
responsive to determining that a second MPLS BFD session is not in an up state or that it is not part of the plurality of MPLS BFD sessions, to transmit a second BFD control packet towards the ingress network device including an MPLS BFD session identifier that uniquely identifies the second MPLS BFD session at the ingress network device, wherein to transmit the second BFD control packet causes an update of the second MPLS BFD session.

10. The egress network device of claim 9, wherein to transmit the second BFD control packet includes setting an ingress BFD session identifier field of the second BFD control packet to include the MPLS BFD session identifier.

11. A method, in an ingress network device, of updating a plurality of Multiprotocol Label Switching (MPLS) Bidirectional Forwarding Detection (BFD) sessions, wherein each one of the plurality of MPLS BFD sessions is established for a given Label Switched Path (LSP) between the ingress network device and an egress network device of an MPLS network, the method comprising:
receiving a BFD control packet from the egress network device; and
in response to determining that a state field of the BFD control packet has an UP value, and that a value of an ingress BFD session identifier field of the BFD control packet matches an ingress group identifier uniquely identifying the plurality of MPLS BFD sessions, updating a set of two or more MPLS BFD sessions based on the ingress group identifier.

12. The method of claim 11, wherein updating the set of MPLS BFD session includes determining that a source Internet Protocol (IP) address of each one of the sets of MPLS BFD sessions is identical to a source IP address of the BFD control packet, that each one of the sets of MPLS BFD sessions is part of the plurality of MPLS BFD sessions identified based on the ingress group identifier, and that each one of the MPLS BFD sessions is in an UP state.

13. The method of claim 12, wherein updating the set of MPLS BFD sessions includes resetting a timer of each one of the sets of MPLS BFD sessions.

14. The method of claim 11, wherein the BFD control packet is a first BFD control packet, and the method further comprises:
receiving a second BFD control packet from the egress network device; and
in response to determining that a state field of the BFD control packet does not have an UP value, or that a value of an ingress BFD session identifier field of the BFD control packet does not match an ingress group identifier uniquely identifying the plurality of MPLS BFD sessions, updating an MPLS BFD session based on a value of the ingress BFD session identifier field.

15. The method of claim 14, wherein updating the MPLS BFD session includes resetting a timer of the MPLS BFD session.

16. An ingress network device for updating a plurality of Multiprotocol Label Switching (MPLS) Bidirectional Forwarding Detection (BFD) sessions, wherein each one of the plurality of MPLS BFD sessions is established for a given Label Switched Path (LSP) between the ingress network device and an egress network device of an MPLS network, the ingress network device comprising:
one or more processors; and
non-transitory computer readable medium that store instructions, which when executed by the one or more processors, cause the egress network device to:
receive a BFD control packet from the egress network device; and
in response to determining that a state field of the BFD control packet has an UP value, and that a value of an ingress BFD session identifier field of the BFD control packet matches an ingress group identifier uniquely identifying the plurality of MPLS BFD sessions, update a set of two or more MPLS BFD sessions based on the ingress group identifier.

17. The ingress network device of claim 16, wherein to update the set of MPLS BFD session includes to determine that a source Internet Protocol (IP) address of each one of the sets of MPLS BFD sessions is identical to a source IP address of the BFD control packet, that each one of the sets of MPLS BFD sessions is part of the plurality of MPLS BFD sessions identified based on the ingress group identifier, and that each one of the MPLS BFD sessions is in an UP state.

18. The ingress network device of claim 17, wherein to update the set of MPLS BFD sessions includes to reset a timer of each one of the sets of MPLS BFD sessions.

19. The ingress network device of claim 16, wherein the BFD control packet is a first BFD control packet, and the ingress network device is further to:
receive a second BFD control packet from the egress network device; and
in response to determining that a state field of the BFD control packet does not have an UP value, or that a value of an ingress BFD session identifier field of the BFD control packet does not match an ingress group identifier uniquely identifying the plurality of MPLS BFD sessions, update an MPLS BFD session based on a value of the ingress BFD session identifier field.

20. The ingress network device of claim 19, wherein to update the MPLS BFD session includes to reset a timer of the MPLS BFD session.

* * * * *